United States Patent
Ott, IV et al.

(10) Patent No.: US 11,049,117 B2
(45) Date of Patent: Jun. 29, 2021

(54) SYNDICATED RATINGS AND REVIEWS

(75) Inventors: Edward Stanley Ott, IV, Palo Alto, CA (US); Micah Laaker, Palo Alto, CA (US); Michael Lee Quoc, San Francisco, CA (US); Matthew McAlister, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 2848 days.

(21) Appl. No.: 11/347,624

(22) Filed: Feb. 2, 2006

(65) Prior Publication Data

US 2007/0179835 A1  Aug. 2, 2007

(51) Int. Cl.
G06Q 30/02  (2012.01)
G06Q 50/00  (2012.01)

(52) U.S. Cl.
CPC ......... *G06Q 30/02* (2013.01); *G06Q 30/0278* (2013.01); *G06Q 50/01* (2013.01)

(58) Field of Classification Search
USPC ............................................. 705/1, 1.1, 500
See application file for complete search history.

(56) References Cited

U.S. PATENT DOCUMENTS 7,403,910 B1 *   7/2008   Hastings ................ G06Q 30/02
                                                       705/26.1
7,409,362 B2 *   8/2008   Calabria ................ G06Q 10/10
                                                       705/26.1
2008/0126476 A1 *   5/2008   Nicholas ................ G06Q 10/10
                                                       709/203

OTHER PUBLICATIONS http://www.epinions.com, taken from www.archive.org (http://web.archive.org/web/20041211040104/www.epinions.com/x10_Online_Stores_Services/display_~reviews) Cited in Office Action as Epinions.com.*

Loomia Recommendation Service; http://recommendations.loomia.com/overview.

* cited by examiner

*Primary Examiner* — Andrew B Whitaker
(74) *Attorney, Agent, or Firm* — James J. DeCarlo; Greenberg Traurig, LLP

(57) ABSTRACT

The present invention relates to a computerized system and method for syndicating independent review and rating information for use by third parties. In one aspect, the present invention includes a method and system for allowing web site operators to cause syndicated ratings from an independent rating provider to appear on web pages generated in response to requests to the operators' web sites, while preserving the independence of the content of the ratings and providing assurance to the viewing public of that independence. Aspects of the present invention allow for ratings from an independent rating provider to be provided in real time and further assists the rating provider in obtaining additional ratings through the web site operators' web pages.

18 Claims, 11 Drawing Sheets

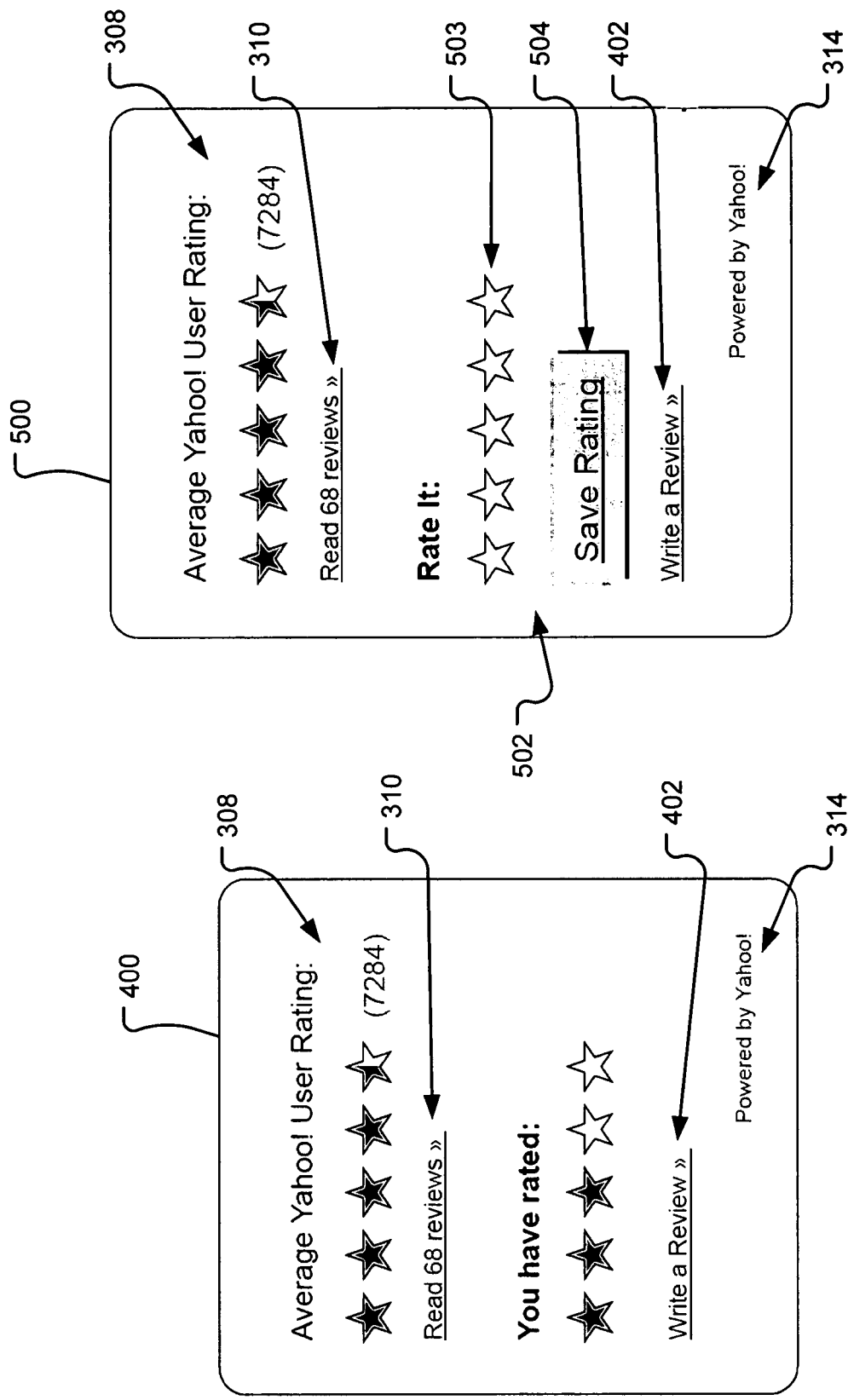

| Movies | DVD / Video | My Movies | Search |

Movies Home | In Theaters | Showtimes & Tickets | Coming Soon | Top Rated | Trailers & Clips | News | Box Office     Search

Brokeback Mountain (2005)

▷ Movie Main Page

Movie Overview
Movie Details
Showtimes & Tickets
DVD/Video Info
Trailers & Clips
Cast and Credits
Awards & Nominations

Reviews and Previews
Critics Reviews
User Reviews
Greg's Preview
Movie Mom's Review

Photos

—1100

What's New
Exclusive - Watch an exclusive clip from 'Brokeback Mountain'

Brokeback Mountain
📽 Watch the Trailer

| The Critics: | My Grade: | A |
| A- | Rate this | B |
| 13 reviews | Movie! | C |
| | Select grade | D |
| Yahoo! Users: | to the right | F |
| B | write a review | |
| 23416 ratings | | |

Based on your 48 ratings, we predict:
⊙ You'll probably like this movie
More Recommendations   Rate Movies

—1102

Showtimes: Favorites
Century 12 Downtown San Mateo
(12:45), (3:50), 7:15
More Favorite Theaters...
More Theaters in 94107
Change location

ADVERTISEMENT

Yahoo! Games

WHEEL of FORTUNE

An epic love story, set against the sweeping landscapes of Wyoming and Texas, that tells you the story of two young men--a ranch-hand and rodeo cowboy--who meet in the summer of 1963 while driving cattle on a mountain range. They unexpectedly forge a lifelong connection, one whose complications, joys and tragedies provide a testament to the endurance and power of love.

Genres: Drama, Romance and Western

SYNDICATED RATINGS AND REVIEWS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The expansion of the Internet and the World Wide Web ("web") has given computer users the enhanced ability to listen to and to watch various different forms of media content through their computers. Such content can be in the form of audio music, music videos, television programs, sporting events or any other form of audio or video content that a user wishes to watch, read, listen to or otherwise perceive in some manner.

For example, podcasting is a method of publishing digital media content, typically audio programs, via the Internet, allowing users to subscribe to a feed of new files (e.g., .MP3s audio files). Podcasting enables independent producers to create self-published, syndicated media content, such as "radio shows," and gives broadcast news, radio, and television programs a new distribution method. Listeners may subscribe to feeds using "podcatching" software (a type of aggregator), which periodically checks for and downloads new content automatically.

Electronic distribution of content over the Internet, podcasting being just one example, has become a very popular and accepted media delivery paradigm. This success has caused the number and variety of podcasts, of types of content distributed and of content delivery sites available to clients to grow exponentially.

Potential content consumers are now confronted with the problems of how to find and select content from the multitude of content providers on the Internet. Content publishers are also confronted with problems including how to effectively market their content and how to cost-effectively differentiate their distribution channel (i.e., website) and product (i.e., content) from their competitors'.

One approach used by online retailers is to provide reviews and ratings of the products offered. Such reviews, ratings, opinions, comments, and other rating information can be particularly useful in assisting potential consumers to find and select products. For example, Amazon.com collects and provides their consumers' reviews and ratings for many of the physical products they offer sale. However, this review service has several drawbacks.

One drawback is that this service is usually provided as a lost leader in order to increase the traffic on a website in the hopes of driving more sales and differentiating the operator's web site from their competitors'. Thus, the ratings and reviews are not a core capability of most content providers and providing such a service entails significant overhead costs.

In addition, most digital consumers are now sophisticated and do not trust rating and reviews provided by web site operators and content providers about their own products or the products they sell. The public's expectation is that any information on a content provider's website about the content provider's own products will be self-serving at best and fraudulent misinformation at worst.

Consumers also recognize that the value of ratings and reviews relies, at least in a large part, on the number and quality of reviews and reviewers. Sophisticated digital consumers know that when there are only a small number of reviewers of a product, that it is possible that a party with some interest in the product being reviewed planted a review in order to manipulate the overall rating of the product. Thus, most content providers (who do not have the size of or the selection of competing products of an Amazon.com) have difficulty in gathering enough reviews and ratings to make them useful to or trusted by the consuming public.

Furthermore, sophisticated digital consumers have come to expect instant and real time information. Reviews that do not include current sentiment in light of today's trends and news are considered stale and are immediately assumed not be an accurate representation of the current quality of the reviewed subject matter. This is particularly true of reviews and ratings provided by magazines and other traditional media outlets that have a very long news cycle.

SUMMARY OF THE INVENTION

The present invention relates to a system and method for syndicating independent review and rating information for use by third parties. In one aspect, the present invention includes a method and system for allowing web site operators to cause syndicated ratings from an independent rating provider to appear on web pages generated in response to requests to the operators' web sites, while preserving the independence of the content of the ratings and providing assurance to the viewing public of that independence. Aspects of the present invention allow for ratings from an independent rating provider to be provided in real time and further assists the rating provider in obtaining additional ratings through the web site operators' web pages.

In one example (which example is intended to be illustrative and not restrictive), the present invention may be considered a method for displaying community rating information on a client computing device. The method includes maintaining a controlled-access community rating database, which contains rating information provided by members of a community. The rating information, such as ratings and reviews, are associated with one or more content items including a first content item. A syndication reference is provided to a first publisher of a content description, which contains information associated with the first content item. A request is received from the client computing device. The request is generated by the client computing device processing the content description provided by the first publisher containing a syndication reference including a content identifier associated with the first content item. Based on the content identifier and the rating information associated with the first content item in the controlled-access community rating database, a community rating is generated for the first content item. The community rating for the first content item is then transmitted to the client computing device.

In one example (which example is intended to be illustrative and not restrictive), the present invention may be considered a system for rating content items. The system includes a community ratings database that stores rating information provided only by members of a community and a syndication system that, in response to a request from a requestor generated by processing a syndication reference, retrieves rating information based on the request and transmits a graphical user interface displaying the rating information and an attribution identifying the community ratings database as the source of the rating information. A syndication reference generator is provided that generates the syndication reference for use by a media server permitted to provide rating information from community rating database. The system may further include a media server generating one or more content descriptions containing a syndication reference in response to requests for content descriptions, the media server and the community ratings database independently controlled by different parties.

In one example (which example is intended to be illustrative and not restrictive), the present invention may be considered another method for displaying community rating information on a client computing device. The method includes transmitting a content description request from the client computing device to a publisher computing device and receiving, from the publisher computing device, a content description of a first content item. Rating information is also received by the client computing device directly from a community ratings database on a computing device different from the publisher computing device. The rating information is information associated with the first content item and is for display with the content description.

In one example (which example is intended to be illustrative and not restrictive), the present invention may be considered another method for displaying community rating information on a client computing device. The method includes receiving, from the client computing device, a request for a content description for a content item and generating the content description for the content item. In the method, the content description includes a syndication reference identifying a community ratings database containing rating information associated with the content item, but the syndication reference contains no rating information. The content description is transmitted to the client computing device. In the method, the rating information includes information independently provided by members of a community to the community ratings database and at least one of the members is not known to the publisher computing device.

In one example (which example is intended to be illustrative and not restrictive), the present invention may be considered a method of generating income and membership from a community rating database. The method includes collecting ratings and reviews of subjects directly from members of a community, including ratings and reviews of a first subject and storing the ratings and reviews in a controlled-access ratings database. A syndication system is provided that, in response to an authorized request from a requesting computing device, generates rating information for the first subject from the ratings and reviews of the first subject and that transmits the rating information to the requesting computing device. The method further includes distributing a syndication reference to an authorized publisher of content descriptions. The syndication reference, when included in a content description transmitted to the requesting computing device by the authorized publisher, automatically causes the requesting computing device to transmit the authorized request to the syndication system. The rating information sent to the requesting computing device includes information independently provided by members of a community to the community ratings database, wherein at least one of the members is not known to the publisher computing device.

Additional features of the invention will be set forth in the description which follows, and in part will be apparent from the description, or may be learned by practice of the invention. The benefits and features of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIG. 4 is another embodiment of a graphical user interface for use in a rating information area of a content description page as described in FIG. 3;

FIG. 5 is yet another embodiment of a graphical user interface for use in a rating information area of a content description page as described in FIG. 3;

FIG. 11 is an embodiment of a graphical user interface, in the form of a rating information area in a content description page describing a movie, displaying rating information from a community rating database associated with the movie according to an embodiment of the present invention; and FIG. 12 is an embodiment of a graphical user interface, in the form of a rating information area in a content description page describing a camera, displaying rating information from a community rating database associated with the camera according to an embodiment of the present invention.

DETAILED DESCRIPTION OF PREFERRED EMBODIMENTS

Figure 1:
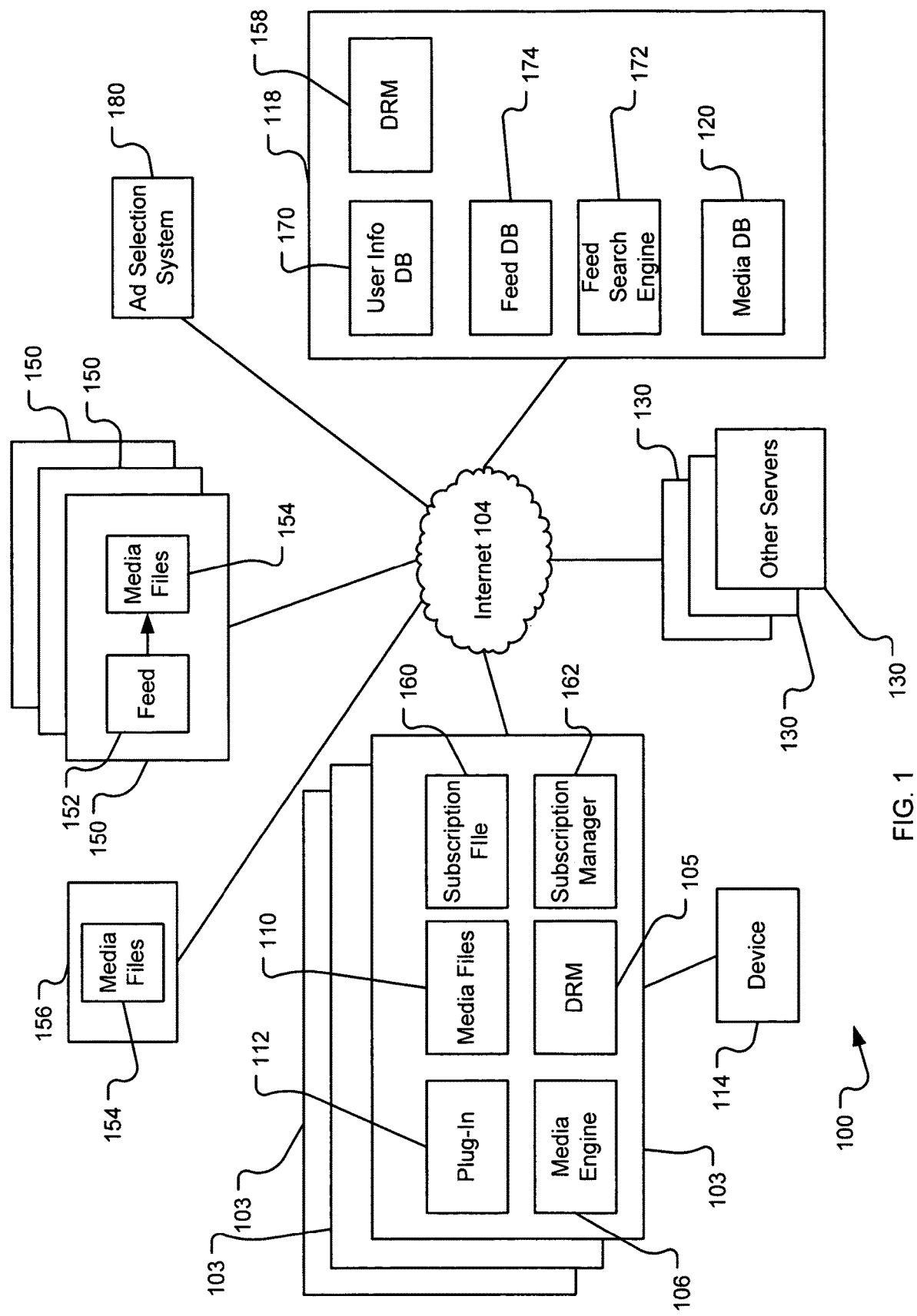
FIG. 1 is a schematic illustrating an exemplary network architecture according to one embodiment of the present invention.

In general, the present invention relates to a system and method for syndicating independent reviews, ratings and other rating information for use by third parties. Rating information may take many different forms and the term should be construed in its broadest interpretation to include any information associated with and describing any identifiable subject. Specifically, rating information includes one or more numerical ratings of related to a subject, such as a quality rating, a performance rating or a cost rating. Rating information also includes reviews provided by members of the public or a specific community, regardless of what form the reviews may take such as a numerical ratings form, a textual form, a audio form, or a video form. Such reviews may be subjective such as personal opinions of a reviewer or may be objective developed from a predetermined testing or evaluation methodology. Thus, in an embodiment rating information includes any information expressed by a user about an identifiable subject.

Rating information may be used to describe any identifiable subject. Such subjects are not limited to physical products (such as books, DVDs, or cars) or digital products (such as software, web sites, or digital content). Rating information may also be used for describing services, such as plumbing services provided by a plumber, real estate brokerage services provided by a real estate agency, and airline travel services provided by a airline. Rating information may also be used to describe businesses such as colleges, restaurants, grocery stores, and car dealerships. Rating information may be used describe locations, such as vacation spots, resorts, cities, and parks, or events such as music festivals, bike races, or basketball tournaments. Rating information may further be used for describing such subjects as the current outlook for a sports team, the potential value of a corporation's traded stock, or the quality of a specific vacation experience (e.g., a cycling vacation in Gerona, Spain). Rating information may be used to describe the popularity of actors, celebrities or people in the news. Rating information may also be used to describe abstract but identifiable subjects such as political campaigns, proposed policies or ideas, and business marketing campaigns. For the purposes of this specification, most of the following discussion will describe an embodiment in which a content item, such as a podcast series or an episode of a series, is the subject of the rating information. However, one skilled in the art will recognize that embodiments of the present invention apply equally to any identifiable subject, including the subjects and subject types described above.

As used herein, the terms "content", "media", or "media files" are used broadly to encompass any product type or category of renderable, experienceable, retrievable, computer-readable filed and/or stored media, either singly or collectively, and individual items of media or content are generally referred to as entries, songs, tracks, pictures, images, items or files, however, the use of any one term is not to be considered limiting as the concepts features and functions described herein are generally intended to apply to any storable and/or retrievable item that may be experienced by a user, whether aurally, visually or otherwise, in any manner now known or to become known. Further, the term content includes all types of media content such as audio and video and products embodying the same.

Embodiments of the present invention will now be discussed with reference to the aforementioned figures, wherein like reference numerals refer to like components. Referring now to FIG. 1, the architecture of an embodiment of the present invention is shown in schematic form. As can be seen in FIG. 1, a system 100 according to one embodiment of the present invention is shown. In general the system 100 allows users to find, experience, share and otherwise utilize different media. Although numerous exemplary embodiments will be discussed in terms of music and/or audio files, this invention can also be utilized with any form of audio, video, digital or analog media content, as well as any other media file type now known or to become known.

Each user utilizes a computing device 103 having a computing device, such as personal computer (PC), web enabled cellular telephone, personal digital assistant (PDA) or the like, coupled to the Internet 104 by any one of a number of known manners. Furthermore, each computing device 103 preferably includes an Internet browser (not shown), such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users. Each computing device also includes a media engine 106 that, among other functions to be further described, provides the ability to convert information or data into a perceptible form and manage media related information or data so that user may personalize their experience with various media.

A media engine 106 may be incorporated into computing device 103 by a vendor of computing device 103, or obtained as a separate component from a media engine provider or in some other art recognized manner. As will be further described below, it is contemplated that media engine 106 may be a software application, or a software/firmware combination, or a software/firmware/hardware combination, as a matter of design choice, that serves as a central media manager for a user and facilitates the management of all manner of media files and services that the user might wish to access either through a computer or a personal portable device or through network devices available at various locations via a network. As used herein, the term media file is used generically to refer to an item of media, as well as associated metadata and/or network location information for that item. A computing device 103 may also be referred to as a rendering device 103 to indicate that it is adapted to retrieve and render media files from the network.

Computing device 103 also may include storage of local media files 110 and/or other plug-in programs 112 that are run through or interact with the media engine 106. In one embodiment, media files 110 are audio files. In another embodiment, media files are video files. In yet another embodiment, media files can be a combination file compatible with a MPEG-21 standard or the like. Computing device 103 also may be connectable to one or more portable devices 114 such as a compact disc player and/or other external media file player, commonly referred to as an MP3 player, such as the type sold under the trade name iPod by Apple Computer, Inc., that is used to portably store and play media files.

Local files may be stored on a mass storage device (not shown) that is connected to the computing device 103 or alternatively may be considered part of the computing device 103. The mass storage device and its associated computer-readable media, provide non-volatile storage for the computing device 103. Although the description of computer-readable media contained herein refers to a mass storage device, such as a hard disk or CD-ROM drive, it should be appreciated by those skilled in the art that computer-readable media can be any available media that can be accessed by the computing device 103.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Additionally, computing device 103 may contain Digital Rights Management software (DRM) 105 that protects the copyrights and other intellectual property rights of the user's media files by enabling secure distribution and/or preventing or hampering illegal distribution of the media files. In one embodiment, DRM 105 encrypts or decrypts the media files for controlled access by authorized users, or alternatively for marking the content with a digital watermark or similar method so that the content can not be freely distributed. Media engine 106 preferably uses the DRM information to ensure that the media files being experienced through media engine 106 are not copied to or shared with users that are unauthorized to listen to or view the content.

The computing device 103 may include the software necessary to subscribe to podcasts. In the embodiment shown, the computing device 103 includes a subscription file 160, such as an OPML file. The subscription file 160 maintains information that identifies what podcasts the user has subscribed to. The subscription file 160 may include a list of feeds 152 and the feed locations.

The computing device 103 also includes a subscription manager 162. The subscription manager 162 can perform the podcatching functions of an aggregator and can periodically poll the feeds identified in the subscription file 160 to determine if new episodes of the podcast are available. Upon determination that a new episode is available, the subscription manager 162 may notify the user or may automatically download the episode to the computing device, such as by retrieving it from a location, such as a media server 150, via the network 104.

The system 100 also includes community server 118. The community server 118 collects and stores information generated by a community of users. In order to increase the size of the user community, the community server 118 may offer a substantial amount of content to its users, such as news content, music downloads, weather information and news groups.

In order to access some or all of the content on the community server 118, users may be required to become members of the community or otherwise be given a member identifier (ID) that identifies the member within the community. Member IDs may then be used by the community server 118 to associate information provided by and about a particular user with that user. In an embodiment, members are required to log into the community, such as with a user name and password, in order to obtain full access. Member IDs and other community information may be stored on a data structure (such as a cookie) on the user's computing device 103 as well as on the community server 118 to facilitate the membership. Logging into the community may require an act on the part of the user, such as entry through a log in user interface, or may be automatic depending on the implementation.

In the embodiment shown, community server 118 includes a media database 120, which stores or communicates with storage devices storing various metadata attributes associated with particular items of media content. Database 120 may be distributed over multiple servers provided with mass storage devices or other forms of computer-readable media or contained in a large mass storage device accessible the community server 118. Other servers 130 make other content and services available and may provide administrative services such as managing user logon, service access permission, digital rights management, and other services made available through a service provider. Although some of the embodiments of the invention are described in terms of music, embodiments can also encompass any form of streaming or non-streaming media including but not limited to news, entertainment, sports events, web page or perceptible audio, video or image content. It should be also be understood that although the present invention is described in terms of media content and specifically audio content, the scope of the present invention encompasses any content or media format heretofore or hereafter known.

The community server 118 also includes a database 170 of user information. The user information database 170 includes information about users that is collected from users or generated by the community server 118 as the user interacts with the community server 118. In one embodiment, the user information database 170 includes user information such as user name, gender, e-mail and other addresses, user preferences, etc. that the user may provide to the community server 118. In addition, the server 118 may collect information directly or indirectly from the user's computing device 103, such as what podcasts the user has subscribed to, what media searches the user has performed, how the user has rated various podcasts and other content items, etc. In effect, any information related to the user and the content items that user consumes or interacts with that is available to the community server 118 may be stored in the user information database 170.

In the embodiment shown, the community server 118 includes a ratings database 174. The ratings database 174 may include a list of content items, such as media files 154 or feeds 152, known to the community server 118. This list may be periodically refreshed as the server 118 searches for new content items or new content items are registered with the community server 118 by content publishers.

For the purposes of illustration, the system 100 will be described in detail with specific reference to podcasts as exemplified content items. Podcasts make a good example because in discussing podcasts many additional functionalities can be discussed which may not apply to an individual content item. For instance, while each episode of a podcast is a content item, the podcast series itself may also be considered a content item and a content item for which additional functionalities, such as subscription, can be discussed. One skilled in the art will realize that any of the features described with reference to podcasts can be adapted to any particular content item.

Using podcasts as an example subject, the ratings database 174 may search for new feeds 152 and for feeds 152 that have been removed from access to the internet 104. Such a ratings database 174 may not be necessary if the searching ability of the server 118 is sufficient to quickly provide user with updated and accurate feed information in response to a user search. The ratings database 174 may include all of the information provided by the feed 152. In addition, the ratings database 174 may include other information generated by the community server 118 or by users. Thus, the ratings database 174 may contain information not known to or generated by the publisher of the feed 152. Thus, new subjects may be identified over time and included in the ratings database 174, either due to searching by the community server 118 or as a result of users alerting the community server to the new subject.

In one embodiment, the databases 120, 174, 170 may be separate and distinct databases, while in an alternative embodiment some or all of the databases 120, 174, 170 may be combined in whole or in part, such as into a single database. The databases 120, 174, 170 part of the server 118 or may be located on separate computing devices that are in communication with the server 118.

In an embodiment, the ratings database 174 includes additional information regarding feeds 152 in the form of "tags." A tag is a keyword chosen by a person accessing the community server 118 to describe a particular feed 152. The tag can be any word or combination of key strokes. Each tag submitted to the community server may be recorded in the ratings database 172 and associated with the feed the tag describes. Tags may be associated with a particular feed 152 (e.g., a series tag) or associated with a specific media file 154 within the feed 152 (e.g., an episode tag). Tags will be discussed in greater detail below.

Since tags can be any keyword, a typical name for a category, such as "science" or "business," may also be used as a tag and in an embodiment the initial tags for a feed are automatically generated by taking the category designations from a feed and using them as the initial tags for the feed. However, note that tags are not a hierarchical category system that one "drills down" through. Tags are not hierarchically related as is required in the typical categorization scheme. Tags are also cumulative in that the number of users that identify a series or an episode with a specific tag are tracked. The relative importance of the specific tag as an accurate description of the associated content (i.e., series or episode) is based on the number of users that associated that tag with the content.

In an embodiment, community members are allowed to provide rating information to be associated with any subject or content item. Using a feed as an example of a rated subject, the user after listening to or otherwise consuming an episode of a feed may rate an episode, say on a scale of 1-5 stars, write a review of the episode, and enter tags to be associated with the episode. As another example, a user may access the community server 118 through a community portal or homepage and provide such rating information on any subject by selecting the subject and entering a rating and review for the subject. All this consumer-generated rating information may be stored in the ratings database 174 and associated with the appropriate episode for use in future searches.

The community server 118 includes a search engine 172. In an embodiment, the search engine 172 performs multiple functions including crawling the network 104 to identify content and subjects, such as feeds and episodes of feeds on the network 104, retrieving feed information and storing it in the ratings database 174, and providing a means for computing devices 103 to easily search the ratings database 174 for feeds and episodes.

Because of the nature of the Internet, subjects such as feeds 152 are expected to change over time, e.g., through the addition of new media files 154 as episodes of the feed 152. In an embodiment, the search engine 172 periodically and automatically crawls the network 104 to find new subjects, new content items, new feeds 152 and for previously identified feeds 152 that have changed since the last time the search engine 172 inspected the feed 152. When crawling the network 104, the search engine 172 can use any suitable network searching or crawling methods, such as for example, the method for crawling information on a network described in commonly owned U.S. Pat. No. 6,021,409, titled "METHOD FOR PARSING, INDEXING AND SEARCHING WORLD-WIDE-WEB PAGES." The search engine 172 creates one or more new entries in the ratings database 174 for every new subject, new content item and new feed 152 it finds. Initially, the entry or entries contain the location of the feed, an identifier of the feed (such as its name), and some or all of the information contained in or otherwise provided by or associated with the content item. For example, for an RSS feed this information may include some or all of the metadata within the RSS feed file. This feed information is retrieved by the search engine 172 from the feed 152 and stored in the ratings database 174 so that the ratings database contains some or all of the information provided in the feed 152. Such information may include the feed description, episode descriptions, episode locations, etc.

An automatic analysis may or may not be performed to match a subject to tags. For example, an automatic analysis may be performed to match the feed 152 to known tags based on the information provided in the feed 152. For example, in an embodiment some RSS feeds include a category element and the categories listed in that element for the feed are automatically used as the initial tags for the feed. While this is not the intended use of the category element, it is used as an initial tag as a starting point for the generation of more accurate tags for the feed. Note that client searches on terms that appear in the feed 152 will return that feed as a result, so it is not necessary to provide tags to a new entry for a client search to work properly. Initially no rating information may be associated with the new entry. The manager of the community server may solicit additional information from the publisher such as the publisher's recommended tags and any additional descriptive information that the publisher wishes to provide but did not provide in the feed 152 itself.

The ratings database 174 also includes such rating information as reviews of the quality of the subjects. In the podcast example, such rating information may include including reviews of the series as a whole and reviews specific to each episode in a given feed 152. The review may be a rating such as a "star" rating and may include additional descriptions provided by community members. The reviews and ratings are received by the community server 118 directly from community members through a rating and review user interface. Thus, all rating information is provided directly from the member to the community server 118. This is true regardless of how the rating and review user interface was generated. In an embodiment, in order for a user to provide a rating or a review for a content item, the user must be a member of the community. Furthermore, in an embodiment the operator of the community server 118 maintains the ratings and review information as a community forum independent of any content publisher's control or oversight. Thus, content publishers can not remove negative information. Ratings and review information submitted by content publishers may be so identified in order to provide the members of the community with an understanding of the potential bias of the information.

In addition to maintaining rating information specific to a subject such as a product, restaurant, media file, feed, or individual episodes within a feed, the ratings database 174 may also include information associated with content publishers, owners, sponsors of the feeds and/or episodes, topics discussed in the feeds or episodes or people in the feeds or episodes. The ratings database 174 may also include access information concerning publishers of content. For example, associated with each feed may be a publisher including the electronic information necessary to interface with the publisher's servers. This information may then be used to interact with the publisher directly as will be described in greater detail below.

In one embodiment of the present invention, similar to the DRM software 105 located on the user's computing device 103, the community server may maintain its own DRM software 158 which tracks the digital rights of media files located either in the media database 120 or stored on a user's computing device. Thus, for example, before the community server 118 streams or serves up or transfers any media files to a user, it validates the rights designation of that particular piece of media and only serves streams or transfers the file if the user has the appropriate rights. This may be determined by an inspection of information contained on the computing device 103, in the user information database 170, or both.

The system 100 also includes a number of media servers 150, that are remote from the computing devices 103 and the community server 118, that publish podcasts or otherwise provide descriptive information about a subject over the network 104. In one embodiment remote means remote in the logical, network sense in that each media server 150, each computing device 103 and the community server 118 may be accessed using different domain names as their network locator, such as the Uniform Resource Locator (URL). For example, the community server 118 may be accessed by a URL of "http://podcast.yahoo.com" while each media server 150 may have a different URL such as "www.abcnews.com" and "www.npr.org". The computing devices 103 may have dedicated URLs or may be devices that can intermittently connect to the Internet 104 and are given temporary URLs by the system through which they connect. In another embodiment, Internet Protocol (IP) addresses for each computing device 103, media server 150 and the community server 118 are different, indicating that the devices are remote from each other, at least in a logical sense.

The media servers 150 store content, such as media files 154 and feed 152, and make the content and content descriptions accessible to consumers' computing devices 103. In the podcast example, media servers 150 include one or more feeds 152, such as RSS feeds, that are accessible through the network 104, such as the Internet as shown. The feeds 152, as will be described in greater detail below, include information about the feed (series information) as well as information about the various media files 154 (i.e., episodes) of the feed 152. The feed 152 also identifies the episodes so that they can be retrieved by a subscription manager on a computing device 103. The media file 154 may reside on the media server 150 with the feed 152, or may be located on yet another server 156 that is, in fact, remote from the podcast server 150 with the feed 152.

As illustrated in FIG. 1, each user's computing device 103, the community server 118 and media servers 150, as well as the other servers 130, 156 are communicatively connected via the Internet 104. In alternate embodiments, different components of the system may be communicatively coupled differently, for example each may be coupled directly to each other wirelessly or by a local or wide area network (WAN) or the like. Additionally, functional components can be distributed so that certain functions of the search engine 172 may be performed at community server 118, or distributed in modular fashion for operation at various locations throughout the system 100. Thus, the description herein of a function or component being associated with a particular device or component or location is merely one possible embodiment.

The search engine 172 also provides users with additional functionality and convenience. The user interface provided by the search engine 172 to the user's computing device 103 allows the user to subscribe to a displayed feed (via a subscribe button), listen to an episode of a displayed feed (via listen button), and obtain the complete information on the feed (via clicking on the hyperlinked title) from the same interface. A user need not know where the feed resides on the Internet and need only to interact with the search engine's user interface to perform these actions. Furthermore, the user does not need to explicitly direct his computer to access the publisher's site to subscribe, listen or obtain additional information on a feed.

The system 100 also includes a syndication system 180 that allows the community rating information, such as ratings and reviews provided by community members, to be accessible to consumers via third party media servers 150, 156. In an embodiment, the operator a media server 150, 156 wishes to provide the syndicated rating information for the content on the media server 150, 156 in such a way that the user can recognize that the rating information is that of the community server 118 and not the operator's. In addition, for various reasons the community server 118 does not want to provide direct access to the rating information to the media server 150, 156. The syndication system 180 interfaces with the ratings database 174 and the user's computing device 103. One of the functions of the syndication system 180 is to receive requests from user's devices 103 and retrieve rating information from the ratings database 174. The syndication system 180 then generates a syndicated rating graphical user interface for incorporation into a response, such as a web page, previously provided by the media server 150, 156. The incorporating is done at the user's 103 computing device as part of the process of rendering the response from the media server 150, 156. In this way, at the media server 150, 156 is not part of the data flow of rating information. Additionally, all communications regarding the rating information are directly between the user's device 103 and the community server 118, even though such communication may be automatically initiated as a result of an initial request from the user's device 103 to a third-party media server 150, 156.

In an embodiment, another function of the syndication system 180 is to directly interact with the user's computing device 103 including retrieving information from it. The synchronization system 180 queries the user's computing device to determine if the computing device 103 is associated with a user that is already known to the community server 118. This may be done by querying the computing device 103 for a data structure containing a community member ID. The community member ID is then used to obtain rating information specific to the member as will be described in greater detail below.

Another function of the syndication system 180 is to interface with the independently-operated media servers 150, 156 that wish to provide the community's rating information with their content descriptions. In an embodiment, some or all of the members of the community are not associated with or known to the independently-operated media servers 150, 156. In addition, the rating information in the community database has been independently provided by the members of the community directly to the community server 118 from the members' computing devices so that the independent media servers have neither control over what information goes into the community database nor control over what information is provided by the database for display on their content descriptions.

In an embodiment, the syndication system 180 generates one or more syndication references for each media server 150, 156 that wishes to provide community rating information. The syndication reference is provided as part of the process whereby the media server 150, 156 signs up for and obtains authorization to provide the community rating information. The syndication reference is then provided to the media server 150, 156 and incorporated, in whole or in part, into the content descriptions they provide. As discussed in greater detail, the incorporated portion of the syndication reference causes a computing device 103 receiving the content description to retrieve the rating information directly from the community rating database 174.

In an embodiment, the syndication system 180 may be implemented as part of the community server 118 as shown. In an alternative embodiment, the syndication system 180 may be implemented as a separate, remote system that can be accessed by any server or computing device connected to the network 104. In yet another embodiment, various components of the syndication system 180 may be separated and distributed among the media servers 150, community server 118 and computing devices 103 in a way the functions of the syndication system 180 are performed even though no discernable single location on the network can be identified as the syndication system 180.

Figure 2:
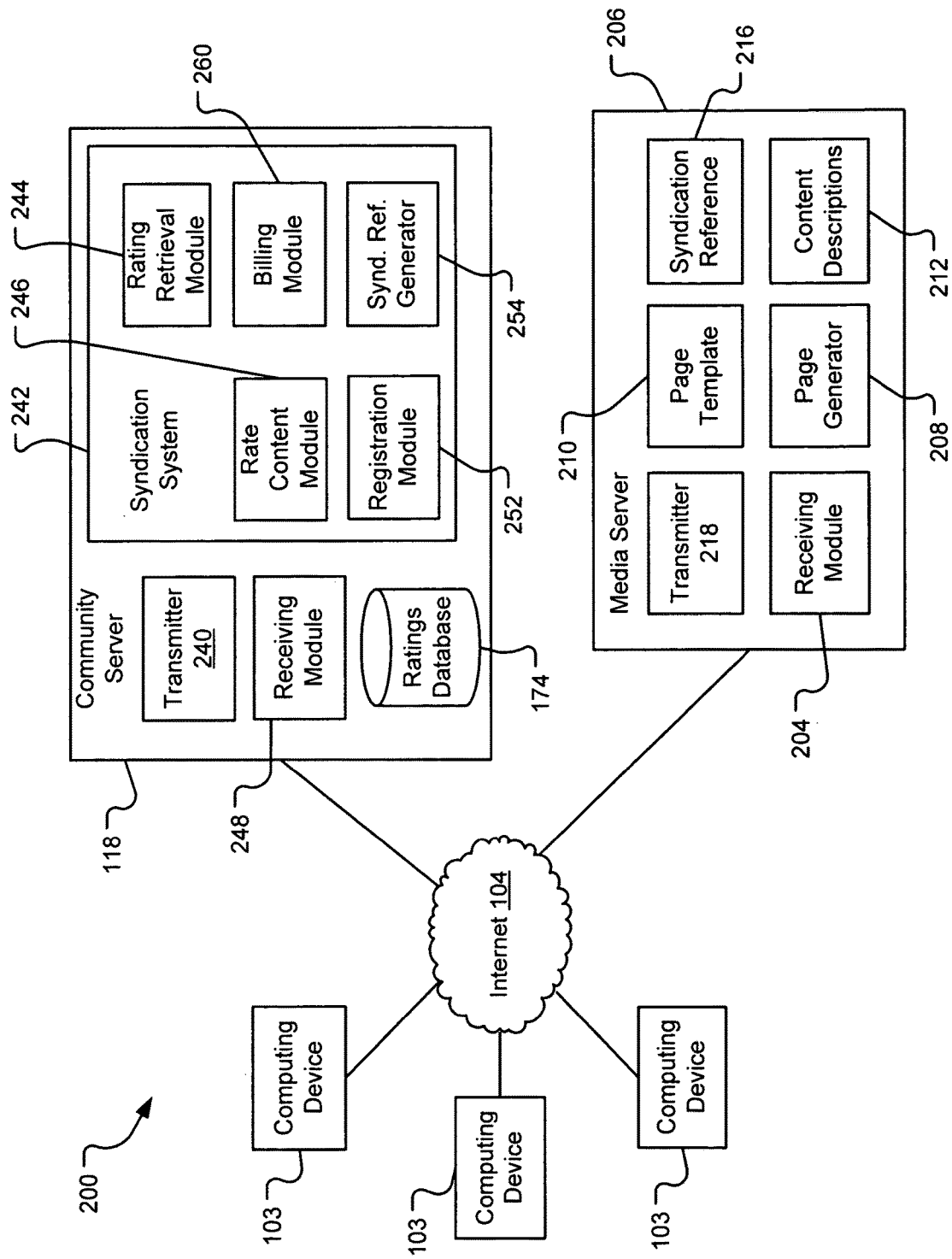
FIG. 2 is an illustration of an exemplified embodiment of an architecture for a syndication system.

FIG. 2 is an illustration of an exemplified embodiment of an architecture for a syndication system. In the architecture 200, users' computing devices 103 communicate with a media server 206 via a network such as the Internet 104. The media server 206 subscribes to the syndicated ratings for at least one content item. In the embodiment shown, the media server 206 receives user requests from the computing devices 103 to display information about content items such as media files or feeds. In an embodiment, the requests are requests for information about content items that are accessible from the media server 206, e.g., the media server 206 is operated by the content items' publisher and is the primary source for the content items on the Internet. In another embodiment, the media server 206 is not a publisher of the content items described (e.g., the content items are accessible at other locations on the Internet), but the operator of the media server 206 wishes to provide the syndicated rating information in addition to their own description of some subject as an additional service. The media server 206 is adapted to generate and transmit responses to these user requests. These responses include a syndication reference that is interpretable by the consumer's computing device 103 and that causes computing device 103 to retrieve the rating information from the community server 118 via the syndication system 242. Thus, in the embodiment shown all communications regarding the rating information, including the transmission of new rating information from the user's device 103 to the community server 118, are directly between the user's device 103 and the community server 118, even though such communication is automatically initiated as a result of an initial request from the user's device 103 to a third-party media server 206.

The example embodiment shown in FIG. 2 illustrates the functions of the architecture 200 as separate modules. Although not required, the system is described for convenience in the general context of functional program modules, which may or may not correspond to specific computer-executable instructions that may be executed by a computer, such as a client workstation or a server. Generally, program modules include routines, programs, objects, components, data structures and the like that perform particular tasks or implement particular abstract data types. Although discussed as separate and distinct modules, one skilled in the art will realize that depending on the implementation choices made during development, some or all of the various modules may combined or further divided into independent sub-modules without changing the overall functionality of the embodiment. In additional, as discussed above in alternative embodiments some or all of the modules described may be distributed throughout other computing devices on the network 104.

The media server 206 is provided with a receiving module 204 for receiving requests from remote computing devices such as computing devices 103. The receiving module 204 is adapted to parse the request and identify the requested information. In an embodiment, the receiving module 204 may also parse the request to obtain information contained within the request, such as information identifying the requesting computing device and the user making the request.

The receiving module 204 may receive requests directly from the requesting computing device 103, i.e., the requests are addressed to the media server 206, or indirectly from other computing devices, i.e., the request is forwarded to the media server with or without the rendering device's knowledge. In one embodiment, a request is a request for a specific web page or displayable at a specified URL, such as for example a browser request for the file "http://www.npr.org/programs/asc/index.html."

In the embodiment shown, the media server 206 is provided with a page generator 208 for generating content description pages that can be displayed by the user's computing device 103 in response to user requests. The content description pages generated by the page generator include a content item description 212 and a syndication reference 216. The syndication reference 216 is a snippet of code interpretable by the user's computing device 103 and that causes computing device 103 to retrieve the rating information from the community server 118 via the syndication system 242. The syndication reference 216 may include a special address or identifier to which rating information requests from the client are to be sent. In addition to the syndication reference, additional information may need to be provided with or included as part of the syndication reference when the content description is generated, such as a publisher ID and a content ID.

Such a content description page may be an electronic data structure, such as a file written in a markup language such as HTML or XML, that may be interpreted by a browser on the computing device 103 to generate a graphical user interface or other display to the user. The content description page may be dynamically generated in response to each request received or may be pre-generated static pages. Alternatively, popular pages may be dynamically created and then cached for a predetermined time period in order to reduce the processing load associated with generating the same page multiple times in a short period.

The page generator 208 may use a page template 210 when dynamically generating content description pages. The generation process may include retrieving a content description 212 from a content description database (not shown) and inserting the content description into the page template 210. If a page template 210 is used, the syndication reference 216 may be included as part of the page template 210. Alternatively, the syndication reference 216 may be retrieved by the page generator as part of the page generation process. The page generator 208 may also define an area, referred to below as a rating information area, on the content description page that is to be filled using data obtained directly from the community server 118.

The media server 206 is also provided with a transmitter 218 for transmitting responses to the requesting device 103. In an embodiment, the transmitter 218 packages the content description pages generated by the page generator 208 into a form that can be transmitted to the request device 103.

The architecture 200 of FIG. 2 includes a community server 118 that includes a receiving module 248 and transmitter module 240, which operate as previously described with reference to the media server 206.

In the embodiment shown, the community server 118 also includes a syndication system 242 for retrieving community rating information from the community rating database 174, which in FIG. 2 is shown as part of the community server 118 although it may be maintained separately. The syndication system 242 is provided with a rating retrieval module 244. The rating retrieval module retrieves the rating information for a specified content item on the content description page requested. The retrieval is performed using a content ID that is provided by the media server to the requesting device 103 and, in turn, provided to the community server 118 by the requesting device 103. In an embodiment, the rating retrieval module 244 retrieves the basic rating information for the content item. As discussed in greater detail below, in an embodiment the rating information retrieval process also includes identifying if the requesting user (the "requester") is a member of the community and, if so, retrieving the requestor's rating information for the content item, if any.

The rating retrieval module 244 requests the rating information for the specified content item from the ratings database 174. The ratings database 174 retrieves the information and transmits it in a response back to the rating retrieval module 244. The rating retrieval module processes this information and generates output data. In an embodiment, the output of the rating retrieval module is a portion of code renderable by the requesting device 103 to create a display of rating information on the requesting device 103. In an embodiment, the output data is a code snippet written in the same language as the content description page provided by the media server 206. The output of the rating retrieval module 244 is then sent, via the transmitter 240, to the requesting device 103. The requesting device 103 then receives the output data and inserts it directly into the content description page so that the rating information is displayed on the content description page to the user of the requesting computing device 103. In an alternative embodiment, a page generator (not shown) on the community server 118 may have to perform additional processing on the output data provided by the rating retrieval module 244 before displayable code is generated.

As part of the ratings retrieval process, the rating retrieval module 244 may query the requesting computing device 103 to determine if the requester is already a community member. In an embodiment, this membership query is a request for information from a data structure, such as a cookie, on the requesting computing device 103. If the data structure is maintained on the requesting computing device, the computing device returns information from the data structure to the community server 118. If the data structure is not on the requesting computing device, then the requestor is assumed to not be a member of the community. In an alternative embodiment, the membership query may be included as part of the processing of the syndication reference 216 by the computing device 103 so that the initial request from the requesting computing device 103 to the community server 118 includes membership information from the data structure, if any, on the computing device 103.

In the embodiment shown, the syndication system 242 is also provided with a rate content module 246. The rate content module 246 allows a requestor to easily rate a subject, such as a content item, on the community server 118 through direct interaction with the rating information provided by the rating retrieval module 244. In the embodiment, if a requestor has not rated the content item a user interface control for rating the content item is provided with the rating information by the rating retrieval module and subsequently displayed by the requesting device 103 on the content description page. This control, when selected by the requester, causes the rate content module 246 to initiate a rating operation, described in greater detail below. The communications during the rating operation are direct communications between the syndication system and the requestor's device 103; no communication between the requestor's device 103 and the media server 206 occurs during this rating operation. In an embodiment, the rate content module 246 then causes the requestor to be presented with one or more content rating web pages generated and managed by the community server 118. These content rating web pages allow the user to input ratings and reviews for the content item directly into the community rating database. Upon completion of the rating process, the requestor is then returned to the content description page generated by the media server 206.

In an embodiment, the operator of a media server 206 may display syndicated ratings from the community server 118 to requestor's by including the syndication reference 216 in content description pages served from the media server 206. The operator may also be required to include a community server recognizable content ID of each content item for which rating information is desired. In an embodiment, the content ID is the URL address of the content item. In an alternative embodiment, the content ID used by the community server 118 must be provided to the media server 206 for each content item for which ratings are desired.

In order to have access to the community server's rating information, the media server 206 may be required to register or otherwise be authorized to access the data. The community server 118 may, as part of the retrieval process, assign and ID to the media server 206 or to the media server's operator to identify the media server 206. This allows the community server 118 to track information such as how often the rating information is accessed through the content description pages of the third party media servers 206. Such access and use information may be used by the community server 118 to determine a fee for the service or determine how valuable the service is to each of the parties involved.

In order to provide the syndication registration module may be provided through which a media server operator may register with the community server 118 and become authorized to have the syndicated ratings provided with its content descriptions. The registration process may include agreeing to terms and conditions of use of the rating information and may also include the media server 206 providing information concerning the content items described by the media server 206. The registration process may also include provision of additional information such as the content ID for content items described by the media server 206.

A syndication reference generator 254 may also be provided. The syndication reference generator may create a syndication reference to be incorporated, in whole or in part, into the content descriptions provided by the media server 206 to the consumer's computing devices 103. The syndication reference may be generated once and provided to the media server 206 for repeated use, or may be regenerated periodically depending on the implementation. In an embodiment, a general syndication reference is provided to which may be added additional information, such as a content ID or a publisher ID, at the time the response is generated by the media server 206. In an alternative embodiment, multiple syndication references may be generated, each being specific to a content item.

The syndication system 242 may also include a tracking and billing module 260. The tracking and billing module 260 maintains records of what rating information was provided to whom and for what content items. In addition, more, less or different information may be recorded, such as member information if the requester is a member of the community. Such member information may include the requestor's demographic, or the requestor's known interests. Confidential information such as e-mail address or name may or may not be provided depending on the privacy terms between the members and the community server. The tracking and billing module 260 may automatically generate an electronic or paper invoice to publishers based on the current contract between the publisher and the operators of the syndication system. The tracking and billing module 260 may automatically generate an electronic or paper payment, reward or credit to the publishers of content descriptions from which new members or new ratings and reviews are received. In this way, publishers may be rewarded for increasing the membership and amount of rating information of the community ratings database. Such payments or credits may also be determined based on a current contract between the publisher and the operators of the syndication system.

Figure 3:
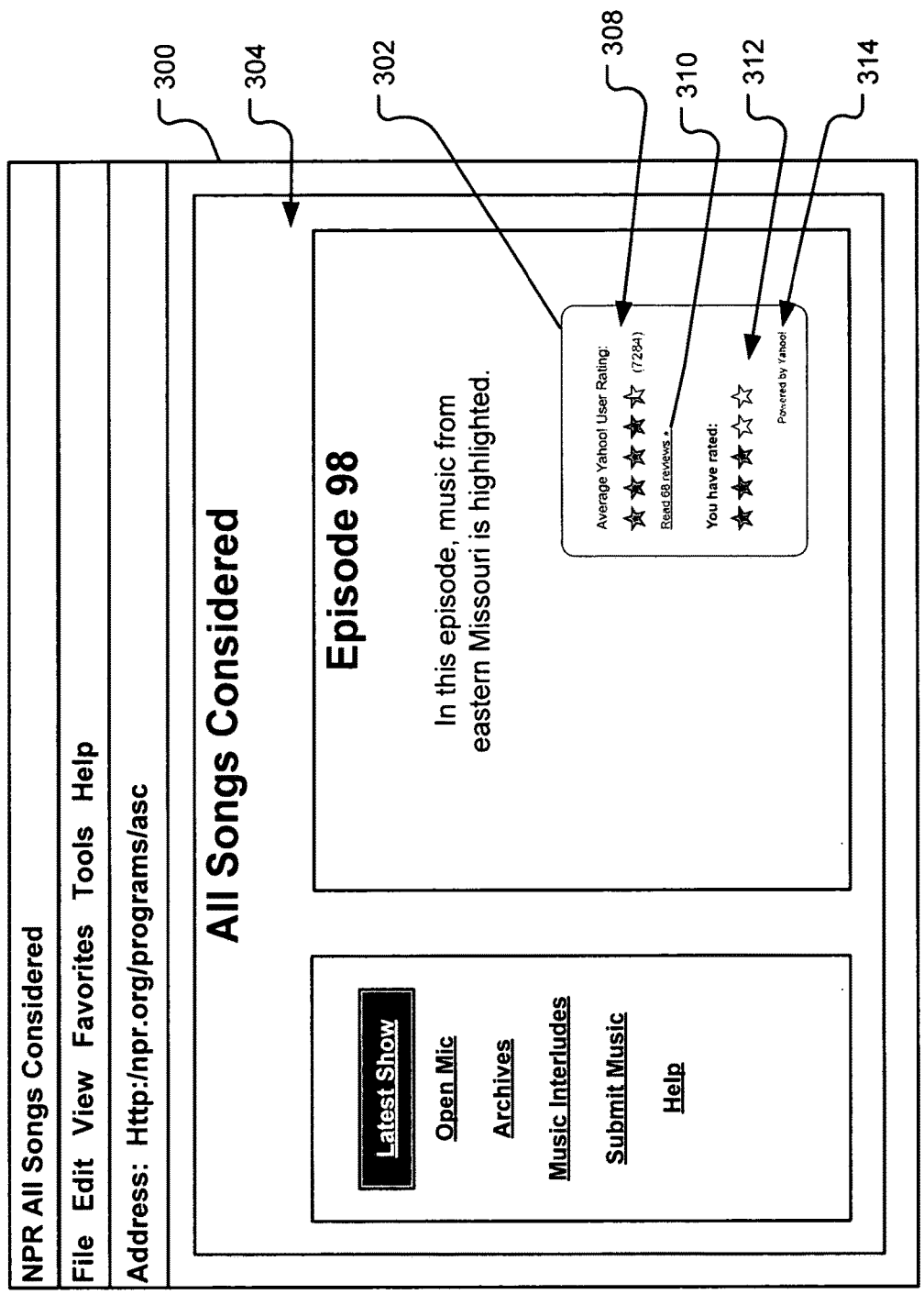
FIG. 3 is an embodiment of a graphical user interface, in the form of a rating information area in a content description page, displaying rating information from a community rating database according to an embodiment of the present invention.

FIG. 3 is an embodiment of a graphical user interface, in the form of a content description page, displaying rating information from a community rating database according to an embodiment of the present invention. In the embodiment shown, the graphical user interface 300 is a web page for a podcast episode describing the contents of the episode. One skilled in the art will understand that this is but one example of a graphical user interface, whether server generated or generated by a rendering device using data retrieved from other computing devices such as media and community servers to populate predetermined areas of the graphical user interface, displaying information describing a content item.

The graphical user interface 300 (GUI) includes several areas within the interface, each containing one or more user interface elements. Examples of user interface elements include non-interactive elements such as text, images and video frames displayed to the user as well as interactive elements such as user controls, for example text boxes, links, scrollbars, icons, and dropdown boxes.

For the purposes of this specification, the GUI 300 can be considered to be divided into two areas: a rating information area 302 and a content description area 304 of the content description page. In the embodiment shown, the content description area 304 of the content description page contains the publisher's content item description generated by the media server 206. In the embodiment shown, the rating information area 302 is within the content description page but this is a GUI layout choice and other embodiments are possible, such as displaying the rating information in a pop-up window over the content description page.

The publisher's content description area 304 may include many constituent areas as desired by the publisher including navigation frames, logos, artwork and text. The rating information area 302 displays the rating information provided by the community server 118. The rating information area 302 is a separate area of the GUI 300 that is populated by syndication system 242 and provided to the requesting computing device 103 for display with or inclusion in the content description page. Thus, the media server 206 is not involved in generating the rating information that appears within the rating information area 302, other than defining an area for the rating information in the content description page and providing the syndication reference to the requesting device 103.

In an embodiment, the rating information area 302 includes one or more interface elements and controls that display the rating information on the content description page and allows the requestor to interact with the community server 118 directly. FIG. 3 shows one embodiment of GUI for a rating information area 302. Alternative embodiments of a user interface in the rating information area 302 are discussed below with reference to FIGS. 4 and 5.

The GUI in the rating information area 302 in FIG. 3 includes a community rating indicator 308. In the embodiment shown, the community rating indicator 308 includes a title identifying the indicator as the "Average Yahoo! User Rating" and a rating, in the form of a five star indicator, graphically illustrating the average rating. In an alternative embodiment the rating may take the form of a different graphic, a numerical indicator, or a grade indicator such as "A+". The indicator may also include, as shown, a numerical report indicating the number of reviewers, "(7284)," that have rated the associated content item on the community rating database.

In the embodiment shown, a user interface control 310 in the form of selectable text (sometimes referred to as a hyperlink) is provided. Selection of the text, such as via a pointing device, causes the requestor's browser to request a reviews web page from the community server 118 that provides the requestor access to the consumer reviews stored in the community rating database. In the embodiment shown, the text also includes an indication of the number of reviews in the community database.

The GUI in the rating information area 302 further includes a requestor-specific rating indicator 312. The embodiment of the GUI in the rating information area 302 shown in FIG. 3 differs from those shown in FIGS. 4 and 5. The GUI in the rating information area 302 shown in FIG. 3 is one shown to requesters that have been identified by the community server 118 and that also have already reviewed and rated the content item associated with the content description area 304. In this case, the requestor's previously provided rating of the content item is displayed to the requester in the requestor-specific rating indicator 312.

The GUI in the rating information area 302 of FIG. 3 further includes an attribution 314. The attribution 314 is in the form of text identifying the community server 118 that maintains and supplies the rating information. The attribution 314, which may also be some recognizable service mark or trademark, indicates to the requester that the information within the rating information area 302 is independently provided by the community server and is not generated or otherwise controlled by the media server's operator. This attribution 314, then, provides the requestor with some measure of comfort that the rating information is an accurate, valid and unbiased of the perception of the quality of the content item within the community. Furthermore, if the rating information area 302 is generated in response to requests to the media server in real time or within a very small caching time period, the requester can be further assured that the rating information is up to date with current community sentiment and not "stale."

FIG. 4 is another embodiment of a GUI 400 for use in a rating information area 302 of a content description page as described in FIG. 3. In an embodiment, the GUI 400 is displayed to requestors that are logged into or otherwise known to the community server when the rating information is requested from the syndication service and that have rated the content item associated with the content description area 304 but that have not provided a review of the content item. How the syndication service determines if the requestor is a community member is discussed below.

The user interface 400 includes some of the elements shown in FIG. 3 including an attribution 314, a community rating indicator 308, a control 310 for accessing reviews stored in the community ratings database and a requestor-specific rating indicator 312. These elements have been previously described with reference to FIG. 3.

The GUI 400 also includes a review control 402. The review control 402 is another control in the form of user-selectable text. Selection of the text, such as via a pointing device, causes the requestor's browser to request a rating and review content item web page from the community server 118 through which the requestor can use to enter a review for the content item into the community rating database.

In an embodiment, the requester may first be required to log into the community server before entering a rating or review. If so, then selection of the review control 402 may first display a log in page where the requestor is prompted to log in or create a user account before the rating and review content item web are displayed to the requestor. By creating a user account the is requesting to become and becomes a member of the community, thus increasing the membership base of the community.

FIG. 5 is yet another embodiment of a GUI 500 for use in a rating information area 302 of a content description page as described in FIG. 3. In an embodiment, the GUI 500 shown in FIG. 5 is displayed to requesters that have not rated or reviewed the content item described in the content description area 304. This determination is made based on the information provided by the syndication system 180 to the community server 118. An embodiment of a method for the determination of what user interface to display in the rating information area 302 is discussed below with reference to FIGS. 6 and 7.

The GUI 500 includes some of the elements shown in FIGS. 3 and 4 including an attribution 314, a community rating indicator 308, a control 310 for accessing reviews stored in the community ratings database and a review control 402. These elements have been previously described with reference to FIGS. 3 and 4.

The user interface 500 also includes a rate content interface element 502 that includes a rating control 503 and a save control 504. The requestor is able to rate the content item by selecting a rating with the rating control 503 and then selecting the save control 504. In the embodiment shown, the requestor selects a desired rating by selecting the empty "stars" to fill in the stars until a desired rating for the content item is shown. Alternative embodiments of the rate content interface element 502 are also possible, such as for example a combined rate and save control (not shown) in which the position of a pointing device over the "stars" determines the rating and a selection while the pointing device is positioned over the control causes the corresponding rating to be saved. When the save control 504 is selected, the rating is saved into the community server's ratings database. The communications resulting from selection of the save control 504 are direct communications between the syndication system and the requestor's device 103, i.e., no communication between the requestor's device 103 and the media server 206 occurs during this rating operation.

Similar to the operation of review control 402, selection of the save control 504 causes the requestor's browser to request a rating and review content item web page from the community server 118 through which the requestor is thanked for rating the content item and may be further prompted to enter a review for the content item into the community rating database.

As discussed above, for controlled-access embodiments in which only community members are allowed to rate and review content items, the requester may first be required to log into the community server or become a community member before entering a rating or review. If so, then selection of the review control 504 may first display a log in page where the requestor is prompted to log in or create a user account before the rating and review content item web are displayed to the requestor.

In the embodiments shown in FIGS. 3-5, all communications resulting from user selection of controls in the rating information area are direct communications between the syndication system and the requestor's device 103. Thus, no communication between the requestor's device 103 and the media server 206 occurs when a user is retrieving additional rating information or providing rating information to the community database.

Figure 6:
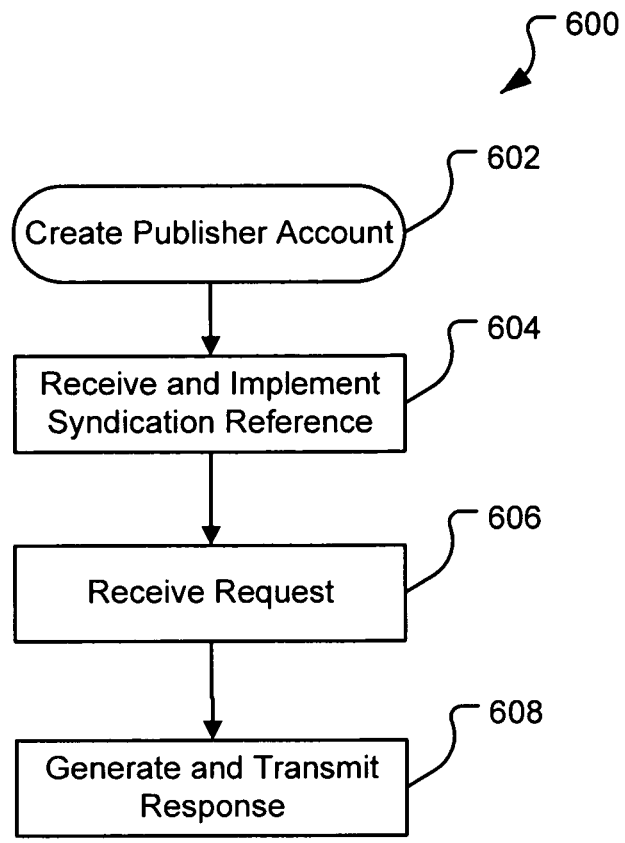
FIG. 6 is a flowchart depicting an embodiment of a method for providing syndicated ratings with a content description in real time.

FIG. 6 is a flowchart depicting an embodiment of a method for providing syndicated ratings with a content description in real time. The embodiment 600 in FIG. 6 illustrates the actions performed by a media server that is operated by some third party other than the community server operator and the requester, e.g., the content item's publisher.

The method starts when the media server operator creates a publisher account with the community in a create account operation 602. In the create account operation 602, the publisher is assigned a publisher identifier (publisher ID). In this context, publisher refers to the publisher of the content description, which may or may not be the actual publisher of the content item described. The content items that can be described by the media server may be provided by the media server operator and compared to the data in the community ratings database to verify that all content items are known to the community server. The results of the comparison may include adding new content items to the community ratings database or revising information in the database or the media server to make the data consistent or correlative between the two systems. For example, in an embodiment the media server operation may be required to maintain a list of content IDs correlating the content items with the community rating information and provide these content IDs in syndication references.

After the publisher account creation, the media server is provided with a syndication reference in a receive syndication reference operation 604. As part of the syndication reference operation 604 instructions or guidelines may also be provided about how to incorporate the syndication reference into the media servers responses to requests for content descriptions. The media server's page generator and page templates are then revised to implement the syndication reference in the content description pages in order for the responses contain the appropriate information.

Next, a receive request operation 606 receives a request from a requesting computing device for a content description for which the media server has been revised to use the syndication reference. The request is a request for information related to a content item, such as a request for a content description page. The request may be a simple URL request for a file name or may contain additional information such as the requestor's member ID or a content item ID, depending on the implementation.

The received request is inspected by the receiving media server. In response to the request, the media server generates and transmits a response to the requesting device in a generate response operation 608. The response from the third party media server includes some or all of the syndication reference in the response. The portion of the syndication reference provided in the response is interpretable by the requesting device to generate a subsequent request to the community server for the rating information.

In an embodiment, the syndication reference includes code that is included in the response in its entirety, along with additional information including the content ID of the content item being described. Determination of the content ID may include an identify content item ID operation (not shown) by the media server that determines, based on the information in the request, the community's content ID for the content item. The content ID is an identifier of the content item that is recognizable by the community server and that allows the community ratings database to retrieve the associated rating information for the content item. In an embodiment, such a content ID is a URL identifying the location of the content item on the Internet. Such an embodiment is desirable for content item publishers in that the value of the ratings and review information in the community database relies, in part, on the community database promoting single point access to the content item, that single point being under the publisher's control.

Figure 7:
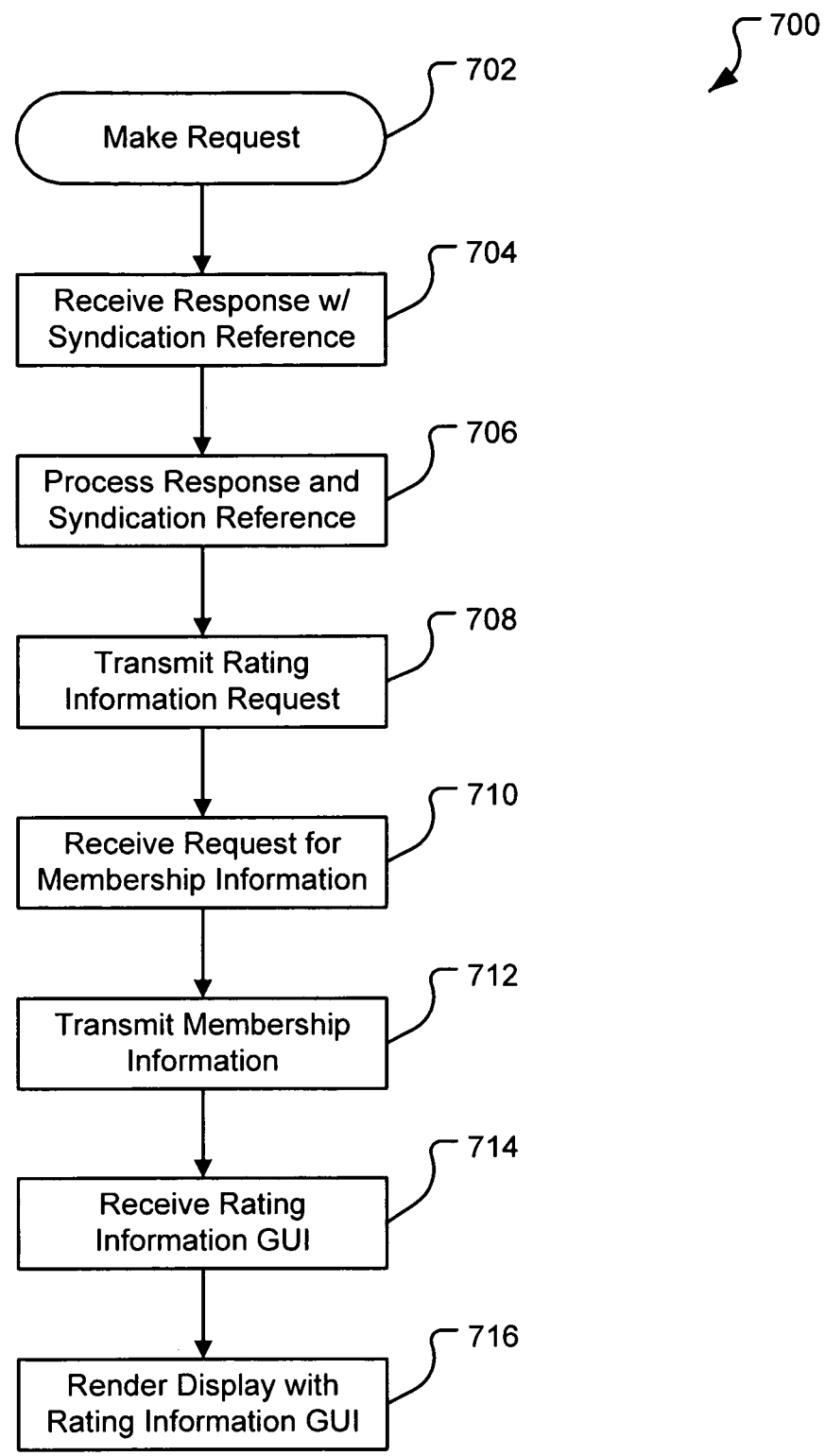
FIG. 7 is a flowchart depicting an embodiment of a method for receiving syndicated ratings with a content description in real time.

FIG. 7 is a flowchart depicting an embodiment of a method for receiving syndicated ratings with a content description in real time. The embodiment 700 in FIG. 7 illustrates the actions performed by a requesting computing device that is operated by the requestor attempting to obtain the content description from the third party server.

In the embodiment 700, the requester makes the initial request for a content description in a request operation 702. The request is transmitted to the third party media server. In response to the request, the media server sends 608 a response containing a portion of the syndication reference. In an embodiment, the media server's response is a content description page as described above.

The requesting device receives the media server's response in a receive content description operation 704. The content description, including the portion of the syndication reference, is processed in a process response operation 706. As part of the process response operation 706, the response is interpreted and a subsequent rating information request to the community server is generated.

The rating information request is then transmitted to the community server in a transmit rating information request operation 708. The rating information is then retrieved by the community server as described below and transmitted to the requesting device.

In the embodiment shown, the community server transmits different rating information, such as in the form of one of the GUIs discussed above with reference to FIGS. 3-5, depending on the membership status of the requestor. In order to determine the membership status, in an embodiment the community server transmits query to the requesting device for the membership status of the requestor. The query is received in a receive membership information request operation 710 and the requested membership information (if the community data structure exists on the requesting device) or an indication of the lack thereof is transmitted to the community server in a transmit membership information operation 712.

As discussed above, in an alternative embodiment, the processing operation 706 may include identifying and retrieving information from a community membership data structure maintained on the requesting device. In that embodiment, the community server may have all the information necessary to retrieve the appropriate rating information and transmit a response, in which case the receive membership information request operation 710 and the transmit membership information operation 712 are not necessary.

After the syndication service has received the requested information, the rating information is transmitted in a response to the requesting device. The requesting device receives the rating information in a receive rating information operation 714. The requesting device then populates the rating information area of the content description and renders the completed content description page to the requestor in a render operation 716. The completed page as displayed, then, contains the media server content description and rating information obtained in real time from the community server.

Figure 8:
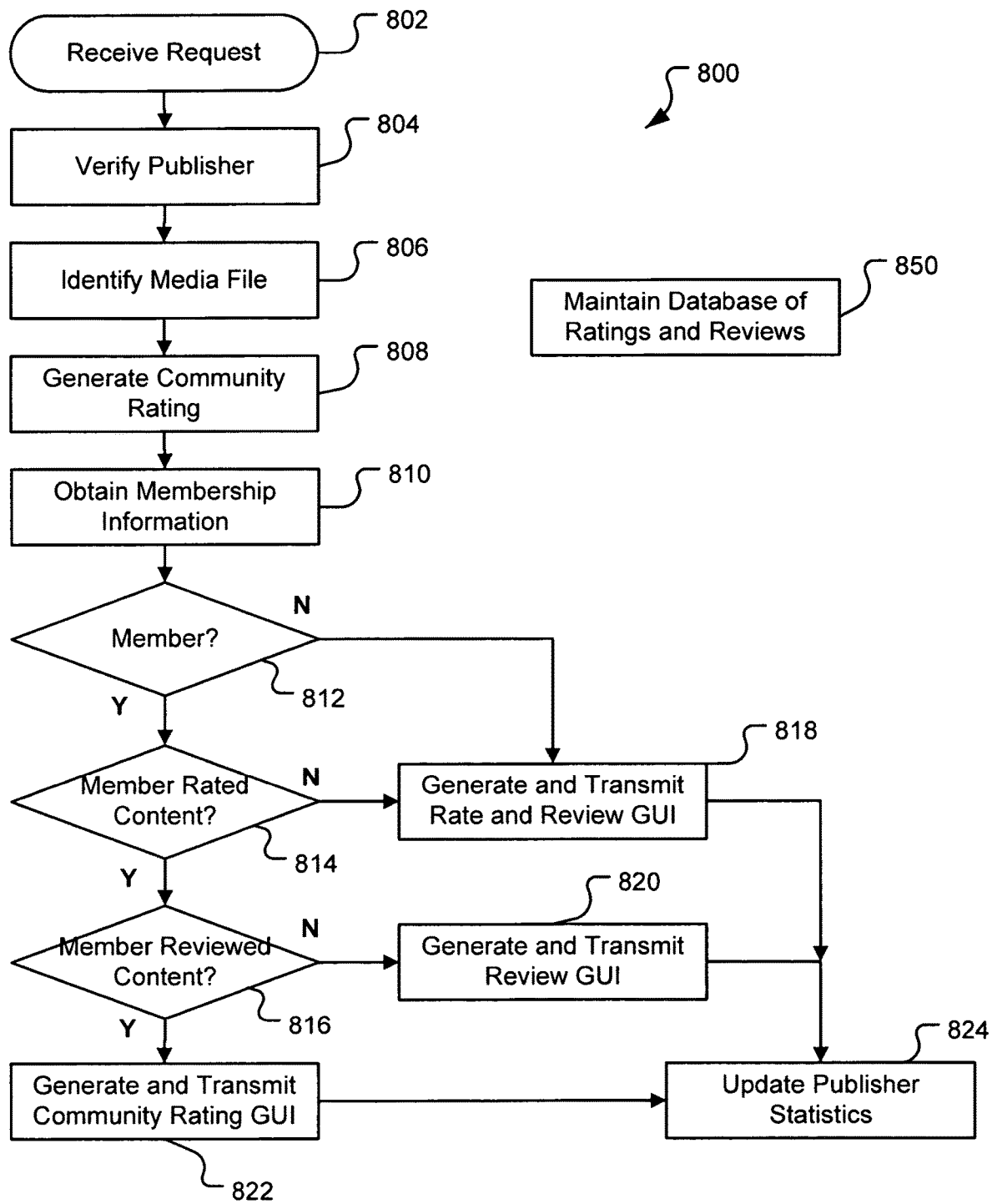
FIG. 8 is a flowchart depicting an embodiment of a method for providing syndicated ratings in real time for use in a content description.

FIG. 8 is a flowchart depicting an embodiment of a method for providing syndicated ratings in real time for use in a content description. The embodiment 800 in FIG. 8 illustrates the actions performed by a community server that is providing syndicated ratings to be displayed with content descriptions provided by a third party server.

In the embodiment 800, a community ratings database, which may or may not be on a separate datastore, is maintained by a community server and accessible to the syndication system in a maintain database operation 850. This includes receiving ratings and reviews over time as members of the community provide feedback on content items.

In the embodiment 800, the method starts when the community server receives a request from a requesting device for rating information in a receive rating information request operation 802. The request is generated via the requesting device's processing of the syndication reference in the content description that is provided by the third party media server. The request includes a content ID associated with the content item that is the subject of the content description and may include a publisher ID associated with the third party media server and, depending on the embodiment, membership information such as a member ID.

The syndication system first verifies the request to determine if the rating information should be provided to the requesting device in a verification operation 804. This verification allows the community to maintain control over the rating information and ensure that the rating information is accessible only under controlled circumstances. The verification operation 804 may include comparing a publisher ID in the request with a listing of approved publishers that have created accounts with the community (see FIG. 9). The verification operation 804 also may be used to retrieve publisher-specific information that is used later to generate the appropriate form of the response, e.g., a specific GUI format for use with the publisher's content description area, for transmittal to the requesting device.

The content ID is obtained from the request in an identify content item operation 806. The content ID may be a community specific content ID or may be a URL or any other information that the community server can use to identify the content item.

After the content ID is obtained, a generate community rating operation 808 retrieves the current rating information from the ratings database and generates a real time current community rating for the content item. In an embodiment, the community rating is the average rating of the content item taking into account all of the ratings provided by the members of the community for that content item available at the time. In another embodiment, any suitable method of generating a representative community rating may be used.

The method includes an obtain membership information operation 810 in which the community server attempts to gather information regarding the membership status of the requester (the operator of the requesting computing device). In an embodiment, the necessary membership information, such as a member ID, may be included in the request from the requesting device. In an alternative embodiment, the obtain member information operation 810 may include requesting and receiving membership information stored on the requesting computing device in a data structure which may have been previously placed there by the community server. The obtain membership information operation 810 determines if the community server can identify the member.

In an embodiment, when a member logs in to the community server a data structure, such as a cookie, is created in memory on the requestor's computing device that remains as long as the user is logged in. Some community servers further allow members to automatically log in each time a computing device is turned on, thus the data structure is always available without requiring the user to log in for each session. In an alternative embodiment, becoming a member of a community may result in a data structure being created in a data store on the computing device, which is used to store membership information. By determining if the community's data structure is on the requestor's computing device, the community server can determine if the requester is member of the community.

In the embodiment 800 shown in FIG. 8, the community server performs a membership determination operation 812 to verify that the requester is a member of the community based on the membership information obtained. In an embodiment, it is possible that the requestor, while a member, cannot be confirmed as a member during this transaction. For example, if cookies are placed in memory as community data structures only when the member is logged into the community server, then if the member is not currently logged in the community server will not be able to identify the requestor as a member.

If the membership determination operation 812 can not verify that the requester is a member of the community, then a provide rate and review GUI operation 818 generates a GUI, such as the GUI 500 in FIG. 5. The rate and review GUI allows a requester to directly interact with the community server regarding the content item associated with the request. The rate and review GUI allows a requestor to rate and review the content item without first searching for the content item on the community server. As mentioned above, because the requestor is not currently identifiable by the community server, before the rating and review can be accepted by the community ratings database the requestor may be required to log in or create a membership account with community server. Providing a rate and review GUI in this way facilitates the provision of rating information to the community server, which increases the number of ratings and reviews in the community ratings database and thus, increases the value of the rating information to future requestors of content descriptions from the third party media server.

If the membership determination operation 812 can verify that the requester is a member of the community, then a rating determination 814 is performed to determine if the member has already rated the content item. In the rating determination 814, the ratings database is inspected to determine if the member ID of the requester is associated with a content item rating for the content item having the content ID. If the member has not previously provided rating information, then the provide rate and review GUI operation 818 is performed as previously described. In the embodiment 800, the community does not allow a member to review a content item without rating the content item also. Therefore, absence of a member's rating of the content item requires that there has also been no review of the content item by the member.

If the member has previously provided a rating, then a review determination 816 is performed to determine if the member has already reviewed the content item. If the member has not reviewed the content item, then a provide review GUI operation 820 generates a review GUI, such as the GUI 400 in FIG. 4. The review GUI allows a requester to directly interact with the community server regarding the content item associated with the request. The review GUI allows a requestor to review the content item directly without having to access the community ratings database through its home page and search GUIs. In addition, because the requestor is currently identified as a member of the community, the rating information can be input directly into the ratings database GUI in a single step without any further logging in by the requester.

If the member has rated and reviewed the content item, then a generate and transmit community rating GUI operation 822 is performed. In the generate and transmit community rating GUI operation 822 a member-specific community rating GUI, such as that shown in FIG. 3, is generated. The community rating GUI is then transmitted to the requesting computing device for insertion into a display of the content description provided by the media server.

The embodiment 800 also includes an update publisher statistics operation 824 in which access information is recorded to indicate that the rating information was provided in response to a request to the media server associated with the publisher ID. This access information can also be used to determine how many requests associated with the publisher ID result in additional ratings and reviews from existing members or new members. The publisher statistics may then be used to by the billing module to bill or credit the publisher in a billing operation (not shown).

Figure 9:
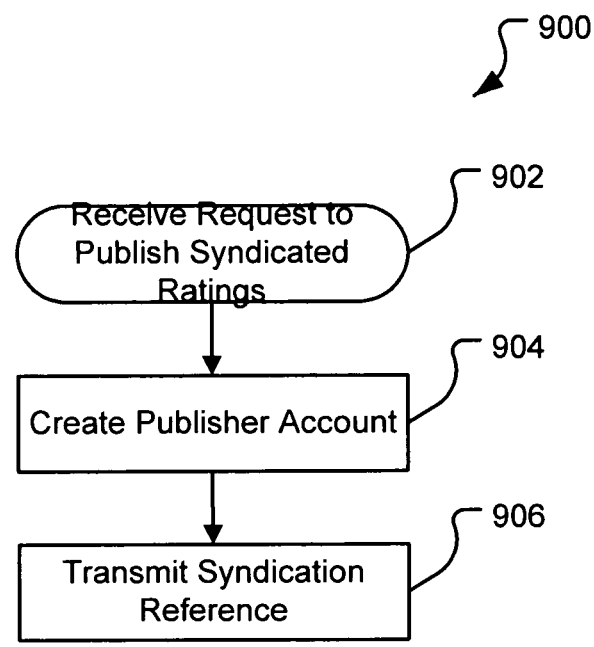
FIG. 9 is a flowchart depicting an embodiment of a method for providing authorization to access syndicated ratings in real time for use in a content description.

FIG. 9 is a flowchart depicting an embodiment of a method for providing authorization to access syndicated ratings in real time for use in a content description. The embodiment 900 in FIG. 9 illustrates the actions performed by a community server that is providing syndicated ratings to be displayed with content descriptions provided by a third party server.

In the embodiment 900, the community server receives a request from a media server operator to have syndicated ratings appear with content descriptions provided by the media server in a receive request operation 902.

In response to the request, a publisher account is created in a create account operation 904. The publisher account is created by the community server and a publisher ID is created that associates the operator with the publisher account. Additional information may also be collected such as mailing addresses, operator name, contact telephone number, and business entity name. The account may be subject to a standard agreement for the use of the syndicated ratings, allowing for automatic registration and account creation. Alternatively, the terms and conditions for use of the syndicated ratings may be negotiated between the parties in an additional operation (not shown).

After the account is created, a syndication reference is generated and transmitted in a provide syndication reference operation 906. The syndication reference is provided to the media server operator for inclusion in the content descriptions provided to requesting devices. The syndication reference may include the publisher ID or that may need to be inserted when responses to requesting devices are generated by the media server. The provide syndication reference operation 906 may also include providing specific guidelines and specifications regarding how the syndication reference is to be included in content descriptions generated by the media server and how the content items are to be referred to in the syndication reference or the content description.

Figure 10:
FIG. 10 is an embodiment of a graphical user interface, in the form of a rating information area in a content description page describing a restaurant, displaying rating information from a community rating database associated with the restaurant according to an embodiment of the present invention.
Figure 12:
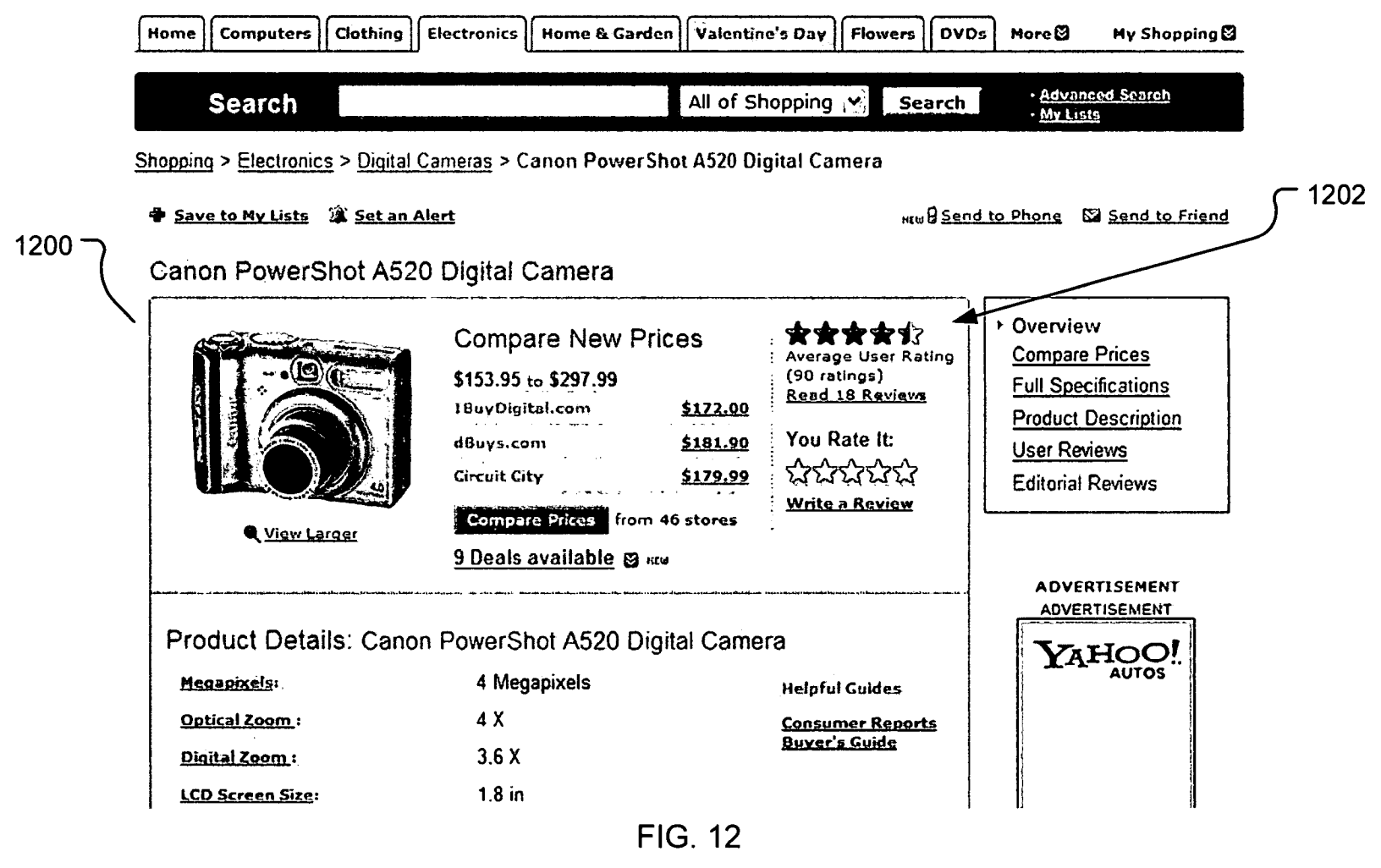

FIGS. 10-12 are example embodiments of content descriptions for different subjects, provided to illustrate that the rating information and syndicated rating system is suitable for use with and can be used in conjunction with any identifiable subject matter. FIG. 10 is an embodiment of a graphical user interface, in the form of a rating information area 1002 in a page 1000 containing a restaurant description. The rating information is from a community rating database and is rating information provided by members of the community to describe their opinions of the restaurant. FIG. 11 is an embodiment of a graphical user interface, in the form of an alternative embodiment of a rating information area 1102 in a page 1100 about a movie. The rating information is from the community rating database and is rating information provided by members of the community to describe their opinions of the movie. The rating information area 1102 in the embodiment shown includes not only the community rating for the movie, but also includes another rating provided by one or more movie rating critics. This illustrates that additional, non-community rating information may be provided along with the community rating information within the rating information area 1102. FIG. 12 is yet another embodiment of a graphical user interface, in the form of a rating information area 1202 in a product description page 1200 for a camera. The rating information is then ratings and reviews provided by members of the community of the camera. In each of the FIGS. 10-12, the publisher of the description is providing the independent, community rating information as an added service in order to provide the consumers with additional information and thereby increase the value of the publisher's page and website to the consumer.

Those skilled in the art will recognize that the methods and systems of the present invention within this specification may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. For example, the above discussed methods could be used to provide rating and review GUIs in a single content description, each rating and review GUI referring to a different content item discussed in the description. For example, in a movie review provided by the media server, a rating and review GUI could be provided for each actor mentioned in the review, as well as a rating and review GUI for the music in the movie and another for the movie as a whole.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

What is claimed is:
1. A method comprising:
 maintaining on a non-transitory computer readable storage medium associated with a computing device a controlled-access community rating database comprising rating information independently provided by members of a community such that each individual rating is independently stored from any other member and publisher's control or oversight, the rating information associated with one or more content items including a first content item;
 providing, via the computing device, a syndication reference to a first publisher of a content description, the content description containing information associated with the first content item;
 receiving, at the computing device, a request from a client computing device, the request comprising information related to the content description provided by the first publisher and a publisher identifier (ID), said information containing a syndication reference including a content ID associated with the first content item;
 parsing, via the computing device, the request to identify the publisher ID, the content ID, the rating information associated with the first content item, the first content item, and information indicating the client computing device from which the request was sent;
 verifying, via the computing device, based on the publisher ID, that the first publisher is authorized to provide a community rating generated from the rating information in the controlled-access community rating database;
 generating, via at least one processor of the computing device, based on said verification, and further based on the identified content ID and the rating information associated with the first content item in the controlled-access community rating database, a community rating for the first content item;
 transmitting, over a network via the computing device, the community rating for the first content item and information associated with a user interface to the client computing device, said transmission causing the user interface to be displayed on a display of the client computing device such that at least the community rating for the first content item is displayed within the user interface; and
 without logging in by the client computing device:
  obtaining a member ID from a membership data structure on the client computing device;

retrieving, based on the member ID and content ID, member rating information previously provided by a first member of the community including a member rating, the member rating information associated with the first content item, and wherein the client computing device is operated by the first member; and transmitting the member rating for inclusion in the content description.

2. The method of claim 1 further comprising: causing the community rating to be displayed within the user interface in a predetermined area of the content description provided by the first publisher.

3. The method of claim 1 wherein the obtaining further comprises:
requesting a member ID from the client computing device; and
receiving a member ID from a membership data structure on the client computing device.

4. The method of claim 1 further comprising: transmitting, based on the member rating information, a user interface displaying the community rating and the member rating, the user interface including a review control, that when selected, displays a review content item user interface on the client computing device adapted to receive a review of the first content item.

5. The method of claim 1 wherein the member rating information indicates the member has not rated the first content item and transmitting further comprises: transmitting a user interface displaying the community rating, the member rating indicating that the member has not rated the first content item, and a rate control for rating the first content item.

6. The method of claim 1 further comprising: updating a record associated with the publisher ID in response to receiving the request from the client computing device.

7. A non-transitory computer-readable storage medium having computer-executable instructions tangibly encoded therein, that when executed by a computing device, perform a method comprising:
maintaining a controlled-access community rating database, the database, associated with a storage medium, including rating information independently provided by members of a community such that each individual rating is independently stored from any other member and publisher's control or oversight, the rating information associated with one or more subjects including a first subject;
providing a syndication reference to a first publisher of a description, the description containing information associated with the first subject;
receiving a request from a client computing device, the request comprising information related to the content description provided by the first publisher and a publisher identifier (ID), said information containing a syndication reference including a content ID associated with the first content item;
parsing the request to identify the publisher ID, the content ID, the rating information associated with the first content item, the first content item, and information indicating the client computing device from which the request was sent;
verifying, based on the publisher ID, that the first publisher is authorized to provide a community rating generated from the rating information in the controlled-access community rating database;

generating, via at least one processor of a computing device, based on the content ID and the rating information associated with the first subject in the controlled-access community rating database, a community rating for the first subject;
transmitting, over a network, the community rating for the first content item and information associated with a user interface to the client computing device, said transmission causing the user interface to be displayed on a display of the client computing device such that at least the community rating for the first content item is displayed within the user interface; and
without logging in by the client computing device:
obtaining a member ID from a membership data structure on the client computing device;
retrieving, based on the member ID and content ID, member rating information previously provided by a first member of the community including a member rating, the member rating information associated with the first content item, and wherein the client computing device is operated by the first member; and
transmitting the member rating for inclusion in the content description.

8. The non-transitory computer-readable storage medium of claim 7 further comprising: causing the community rating to be displayed within the user interface in a predetermined area of the content description provided by the first publisher.

9. The non-transitory computer-readable storage medium of claim 7 wherein the obtaining further comprises:
requesting a member ID from the client computing device; and
receiving a member ID from a membership data structure on the client computing device.

10. The non-transitory computer-readable storage medium of claim 7 further comprising: transmitting, based on the member rating information, a user interface displaying the community rating and the member rating, the user interface including a review control, that when selected, displays a review content item user interface on the client computing device adapted to receive a review of the first content item.

11. The non-transitory computer-readable storage medium of claim 7 wherein the member rating information indicates the member has not rated the first content item and transmitting further comprises: transmitting a user interface displaying the community rating, the member rating indicating that the member has not rated the first content item, and a rate control for rating the first content item.

12. The non-transitory computer-readable storage medium of claim 7 further comprising: updating a record associated with the publisher ID in response to receiving the request from the client computing device.

13. A system, comprising:
non-transitory computer-readable storage medium having computer-executable instructions tangibly encoded therein; and
a computing device, configured to execute the instructions to:
maintain a controlled-access community rating database, the database, associated with a storage medium, including rating information independently provided by members of a community such that each individual rating is independently stored from any other member and publisher's control or oversight, the rating information associated with one or more subjects including a first subject;

provide a syndication reference to a first publisher of a description, the description containing information associated with the first subject;

receive a request from a client computing device, the request comprising information related to the content description provided by the first publisher and a publisher identifier (ID), said information containing a syndication reference including a content ID associated with the first content item;

parse the request to identify the publisher ID, the content ID, the rating information associated with the first content item, the first content item, and information indicating the client computing device from which the request was sent;

verify, based on the publisher ID, that the first publisher is authorized to provide a community rating generated from the rating information in the controlled-access community rating database;

generate, via at least one processor of a computing device, based on the content ID and the rating information associated with the first subject in the controlled-access community rating database, a community rating for the first subject;

transmit, over a network, the community rating for the first content item and information associated with a user interface to the client computing device, said transmission causing the user interface to be displayed on a display of the client computing device such that at least the community rating for the first content item is displayed within the user interface; and without logging in by the client computing device:
obtain a member ID from a membership data structure on the client computing device;
retrieve, based on the member ID and content ID, member rating information previously provided by a first member of the community including a member rating, the member rating information associated with the first content item, and wherein the client computing device is operated by the first member; and
transmit the member rating for inclusion in the content description.

14. The system of claim 13 wherein the computing device is further configured to execute the instructions to: cause the community rating to be displayed within the user interface in a predetermined area of the content description provided by the first publisher.

15. The system of claim 13 wherein the computing device is further configured to execute the instructions to:
request a member ID from the client computing device; and
receive a member ID from a membership data structure on the client computing device.

16. The system of claim 13 wherein the computing device is further configured to execute the instructions to: transmit, based on the member rating information, a user interface displaying the community rating and the member rating, the user interface including a review control, that when selected, displays a review content item user interface on the client computing device adapted to receive a review of the first content item.

17. The system of claim 13 wherein the member rating information indicates the member has not rated the first content item and wherein the computing device is configured to execute the instructions to: transmit a user interface displaying the community rating, the member rating indicating that the member has not rated the first content item, and a rate control for rating the first content item.

18. The system of claim 13 wherein the computing device is further configured to execute the instructions to: update a record associated with the publisher ID in response to receiving the request from the client computing device.

* * * * *